United States Patent [19]

Hieble

[11] Patent Number: 5,894,903

[45] Date of Patent: Apr. 20, 1999

[54] MOTORCYCLE WITH ADJUSTABLE-POWER FRONT WHEEL DRIVE (ALL WHEEL DRIVE)

[76] Inventor: Siegfried Hieble, Unterried 49, D-88167 Grunbach, Germany

[21] Appl. No.: 08/810,178

[22] Filed: Feb. 28, 1997

[30] Foreign Application Priority Data

Feb. 29, 1996 [DE] Germany ............... 196 08 124

[51] Int. Cl.$^6$ ............................................. B62D 61/02
[52] U.S. Cl. ................. 180/224; 180/247; 60/436; 192/103 R; 477/175
[58] Field of Search ................................. 180/223, 224, 180/230, 247; 60/435, 436, 437, 428; 192/103 R, 76; 477/86, 175, 180

[56] References Cited

U.S. PATENT DOCUMENTS

| | | | |
|---|---|---|---|
| 4,157,739 | 6/1979 | Frye | 180/224 |
| 4,684,143 | 8/1987 | Sato | 180/224 X |
| 5,360,381 | 11/1994 | Swist | 477/175 |
| 5,644,916 | 7/1997 | Hayasaki | 60/436 |

FOREIGN PATENT DOCUMENTS

| | | | |
|---|---|---|---|
| 2846741 | 4/1980 | Germany . | |
| WO 88/09739 | 12/1988 | United Kingdom | 180/224 |

OTHER PUBLICATIONS

"PS—Die Motorrad Zeitung", No. 9, Sep. 1976, pp. 10–12.

*Primary Examiner*—Matthew C. Graham
*Assistant Examiner*—Pamela J. Lipka
*Attorney, Agent, or Firm*—Christie, Parker & Hale, LLP

[57] ABSTRACT

A two wheel drive motorcycle is provided with an unsteerable rear wheel, a steerable front wheel, a drive unit having a driving motor for driving the rear wheel and a transmission device coupled to the drive unit for driving the front wheel. The transmission device has a hydrostatic drive having a hydraulic pump driven by the driving motor and whose hydraulic motor is mounted on an arm of the front fork. The hydraulic pump has constant output and the hydraulic motor has a constant input matched to the pump output. Hydraulic fluid is delivered from the hydraulic pump to the hydraulic motor by a pressure line. The pressure in the pressure line is controlled by a pressure control valve which can be adjusted to maintain a pressure in the range of approximately 20 to 200 bars. A check valve redirects the hydraulic fluid from the pump to a return line back to the pump when the rotational speed of the rear wheel is a predetermined amount, preferably in the range of 1%–3%, faster than the rotational speed of the rear wheel allowing the front wheel to freely rotate. When the rotational speed of the rear wheel is greater than the predetermined range, the check valve allows the hydraulic fluid to drive the hydraulic motor for driving the front wheel.

4 Claims, 2 Drawing Sheets

MOTORCYCLE WITH ADJUSTABLE-POWER FRONT WHEEL DRIVE (ALL WHEEL DRIVE)

BACKGROUND OF THE INVENTION

This invention relates to a motorcycle having an unsteerable rear wheel, a drive unit having a driving motor for driving the rear wheel, a steerable front wheel, the drive unit being connected with the front wheel by a transmission device for driving it, and the transmission device having a hydrostatic drive whose hydraulic pump is driven by the driving motor of the drive unit and whose hydraulic motor is disposed on an arm (fork arm) of the front fork.

Motorcycles of the above-mentioned type are known for example from "PS—Die Motorrad Zeitung", No. 9, 1976, pages 10 to 12.

Two wheel drive motorcycles have the advantage of being easier to ride on difficult, swampy, pathless, snow-covered or similar terrain, and are not as likely to get stuck in such terrain. Motorcycles with two wheel drive have not gained acceptance up to now because of their complicated construction which usually involves considerable additional weight, and their high cost due to the fact that they are very expensive to produce.

The greatest handicap with current two wheel drive motorcycles is that both wheels are continuously being driven if the front wheel drive is activated by the rider. As such when the front wheel drive is activated, the maneuverability and reliability of riding are not ensured.

To solve this problem the prior art (DE 28 46 741 Al) proposed that a motorcycle be provided with a transmission device formed with a hydrostatic drive having a hydraulic pump with an adjustable delivery which is driven by the driving motor. The hydraulic pump drives a hydraulic motor which is disposed on the hub of the front wheel. The hydraulic motor drives the front wheel.

SUMMARY OF THE INVENTION

The present invention solves the above problems by providing a motorcycle with two-wheel drive having no appreciable disadvantages over a conventional motorcycle with rear wheel drive, apart from additional weight.

The aforementioned problems are solved by using a hydraulic pump having a constant delivery to drive a hydraulic motor having the same constant intake as the hydraulic pump. The hydraulic motor is coupled to and in turn drives the front wheel. Hydraulic fluid is delivered from the hydraulic pump to the hydraulic motor by a pressure line. The pressure of the hydraulic fluid being delivered is controlled by a pressure control valve which is adjusted to regulate the pressure to approximately 20 to 200 bars through an adjusting element typically located on the motorcycle turning handle. A check valve or freewheel valve is provided between the pressure line to and a return line from the hydraulic motor. For illustrative purposes, "check valve" is used herein to refer to either a check valve or a freewheel valve. When open, the check valve routes the hydraulic fluid from the pressure line to the return line circumventing the hydraulic motor. As such, the hydraulic motor is idle and does not supply any power to the front wheel, allowing the front wheel to rotate freely.

The check valve is preferably adjusted to close when the rotation of the rear wheel is from 1% to 3% faster than the rotation of the front wheel. As such, when the rotation of the front wheel is 1%–3% (depending on the setting of the sensor) faster, the hydraulic fluid is directed to the hydraulic motor for driving the front wheel.

The hydraulic pump, hydraulic motor, the check valve and the pressure valve make up the transmission for driving the front wheel of the motorcycle.

Preferred embodiments of the invention are the object of the appended claims.

The inventive motorcycle has a hydraulic pump with constant delivery and a hydraulic motor with constant intake. A hydraulic pump with constant delivery offers the advantage of being cost-effective to produce and easy to service, while furthermore being small and light due to its simple construction. Its use is permitted according to the invention by the interplay with a hydraulic motor having constant and equal output.

The inventive motorcycle furthermore, has the feature that the hydraulic fluid delivered by the hydraulic pump is transported through a pressure line via a pressure control valve which is adjustable continuously from 20 to 200 bars through an adjusting element. These features prevent the overloading of the of the hydraulic pump and hydraulic motor.

Furthermore, the inventive motorcycle has the feature that the check valve permits the rotating speed of the front wheel to be to about 1% to 3% slower than that of the rear wheel under normal operation. This allows for improved performance in curves.

In the inventive motorcycle the hydraulic pump is preferably constantly coupled with the motorcycle drive unit (the motorcycle motor) or the rear wheel via a twin chain wheel. This permits the drive to follow continuously, the gears to be changed without great effort (very important in cross-country sport), and the entire system to be mounted on the standard type motorcycle without very great changes.

In the inventive motorcycle the hydraulic pump can be driven via a chain wheel mounted on the cardan shaft. Alternatively the hydraulic pump can be driven directly via a rear wheel.

The hydraulic motor of the inventive motorcycle is preferably mounted on a fork arm and connected via a chain with a chain wheel fastened to the front wheel, thereby driving the front wheel.

BRIEF DESCRIPTION OF THE DRAWINGS

The inventive motorcycle will be explained in the following with reference to preferred embodiments shown in the figures of the drawing, in which.

DETAILED DESCRIPTION

The disclosure of German patent application 196 08 124.6-12 filed on Feb. 29, 1996, is incorporated fully herein by reference. Priority of the this German application is claimed.

Figure 1:
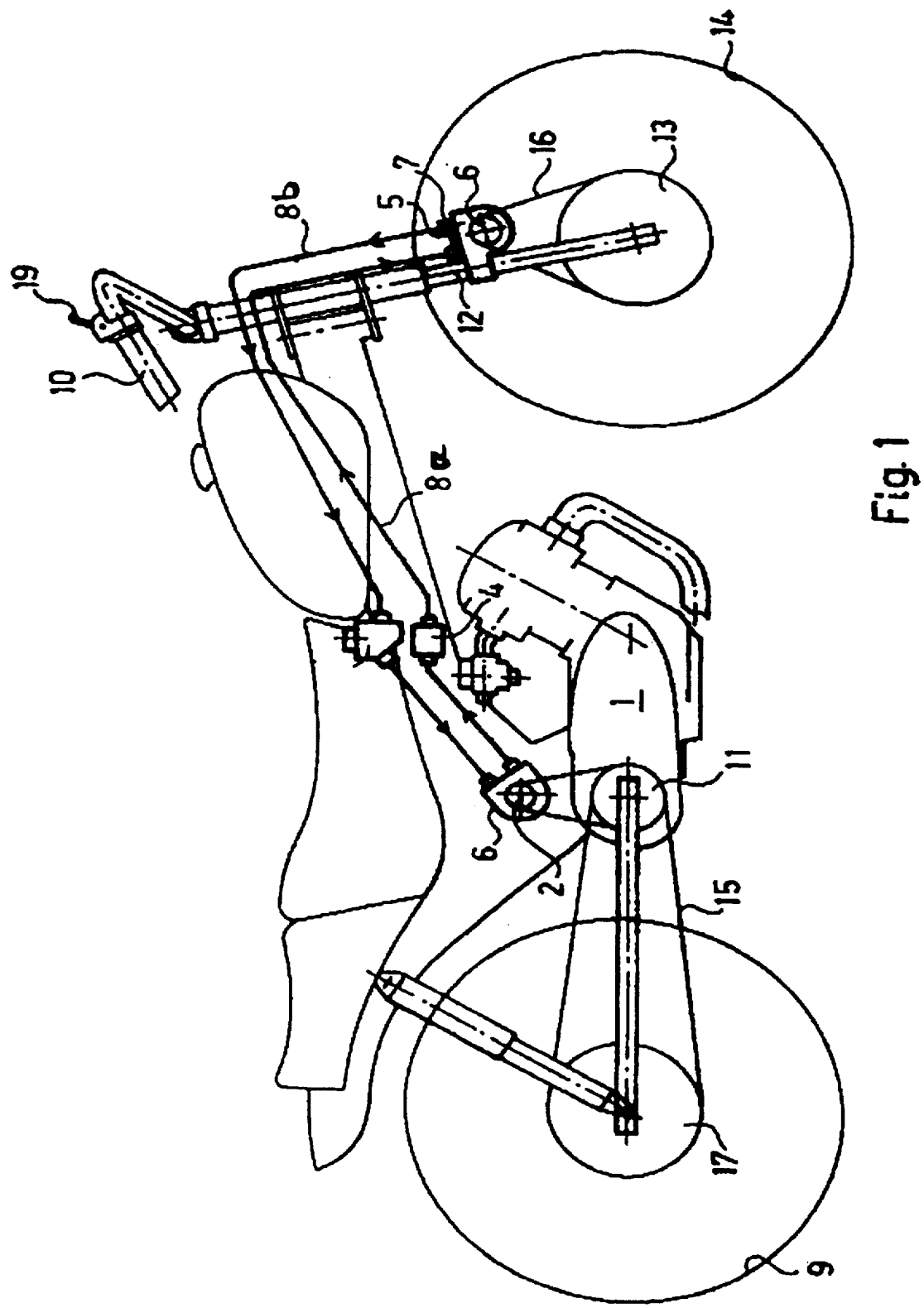
FIG. 1 shows a first preferred embodiment of the inventive motorcycle.

In the inventive motorcycle shown in FIG. 1, hydraulic pump 2 is connected via chain wheel 11 with driving motor 1 of the motorcycle and is driven thereby. The motorcycle has unsteerable rear wheel 9 with a drive unit having driving motor 1 for driving rear wheel 9. The motorcycle has a steerable front wheel 14. A driving mechanism having a transmission device 5 is coupled to the front wheel 14. The transmission device 5 has a hydrostatic drive having a hydraulic motor 6, a hydraulic pump 2, a check valve 7 and pressure valve 4. The hydraulic motor is mounted on an arm 12 of the motorcycle front fork. The hydraulic motor is, preferably, coupled to the front wheel with a chain for driving the front wheel. The hydraulic pump 2 for driving the hydraulic motor 6 is coupled to and driver by the driving motor 1. Hydraulic pump 2 has a constant delivery. Hydraulic motor 6 has the same constant intake as the hydraulic pump. Hydraulic fluid is transported from the hydraulic pump to the hydraulic motor via a pressure line 8a. Fluid from the hydraulic motor is returned to the hydraulic pump through return line 8b.

The pressure valve 4 controls the pressure on the pressure line. The pressure valve, preferably, maintains to the pressure within the pressure line to a level between, preferable 20–200 bars. The pressure to be maintained is selected through an adjusting lever 19 located, preferably, either on the turning handle 10 or on the handle bar of the motorcycle. The pressure valve operates continuously to maintain the selected pressure within the line.

The freewheel or check valve 7 is provided between the pressure line 8a to and the return line 8b from the hydraulic motor. For illustrative purposes, "check valve" is used herein to refer to either a check valve or a freewheel valve. When open, the check valve routes the hydraulic fluid from the pressure line to the return line circumventing the hydraulic motor 6. As such, the hydraulic motor is idle and does not supply any power to the front wheel, allowing the front wheel to rotate freely.

The check valve opens or closes in response to the difference in the rotational speed between the two wheels. The check valve is preferably adjusted to close when the rotation of the rear wheel is from 1% to 3% faster than the rotation of the front wheel. As such, when the rotation of the rear wheel is 1%–3% (depending on the setting of the sensor) faster, the hydraulic fluid is directed to the hydraulic motor for driving the front wheel. As it would become apparent to one skilled in the art various separate sensors may be used in combination with the check valve for detecting the rotational speeds of the wheels.

The power with which front wheel 14 is driven can be adjusted for every terrain or road without letting go of the handlebar. The power driving the front wheel is directly related to the pressure in the pressure line. The pressure in the pressure line is controlled by the pressure valve 4. A separate adjustment selector lever 19 may be mounted on the left side of the handle bar or on the turning handle 10, so it can be easily reached by the rider. Preferably, the lever is connected to the pressure control valve 4 by a double Bowden wire (not shown). The rider selects the pressure on the pressure line and, thereby, the power driving the front wheel for the terrain or road conditions at hand by changing the pressure valve 4 setting using the lever 19. The pressure control valve 4 may also be electronically controlled. In such case, a "+" or "−" rocker switch is placed on the instrument panel preferably on the left half of the handlebar. In practice, however, placing the selector lever 19 near or on the turning handle 10 is preferred, since the right hand is already grasping the accelerator to hold the handlebar, and since the driving power on the front wheel can be reduced and increased again within a split second upon a change in terrain. In this regard, the traction and thus, the maneuverability and riding safety not impaired by driving the front wheel when not need.

In an alternative embodiment, a selector lever (not shown) for selecting the pressure to be maintained by the pressure valve 4 is coupled to the motorcycle accelerator. In this regard, as the accelerator is turned to increase the power for driving the rear wheel, the power for driving the front wheel is also increased. In this regard, it is ensured that the power delivered to drive the front wheel is proportional to the power driving the rear wheel.

The inventive motorcycle can be ridden like a normal motorcycle with rear wheel drive since power is not supplied to drive the front wheel unless the rear wheel is rotating 1% to 3% faster than the front wheel. Consequently, the inventive motorcycle can corner like a normal rear wheel drive motorcycle. Should the rear wheel rotate at a speed more than 1% to 3% slower than speed of the front wheel, however, valve 7 closes and the front wheel is driven by the hydraulic motor with a power depending on the nature of the terrain and the preselected pressure level on pressure control valve 4. When the check valve is open the hydraulic motor 6 takes in more oil than pump 2 provides since it gets the lacking oil from the return line through the check valve 7 with no expenditure of energy.

In a normal motorcycle with rear wheel drive a brake disk is mounted on the front wheel on one side and the corresponding brake clasp on stable rings on the fork arm, preferably on the right.

Driving chain wheel 13 is preferably mounted on the left side of the front wheel, and hydraulic motor 6 for the front wheel drive is fastened to the fork arm on the left at the same level as the brake clasp on two stable oblong hole rings (for chain adjustment or other chain adjusting apparatus).

This simple manner of mounting provides the possibility of changing gears by changing the twin chain wheel (chain driving pinion) 11 on the driving unit and on the hydraulic pump 2 on the front wheel drive, which may be very important for different operating conditions such in different cross-country races.

Figure 2:
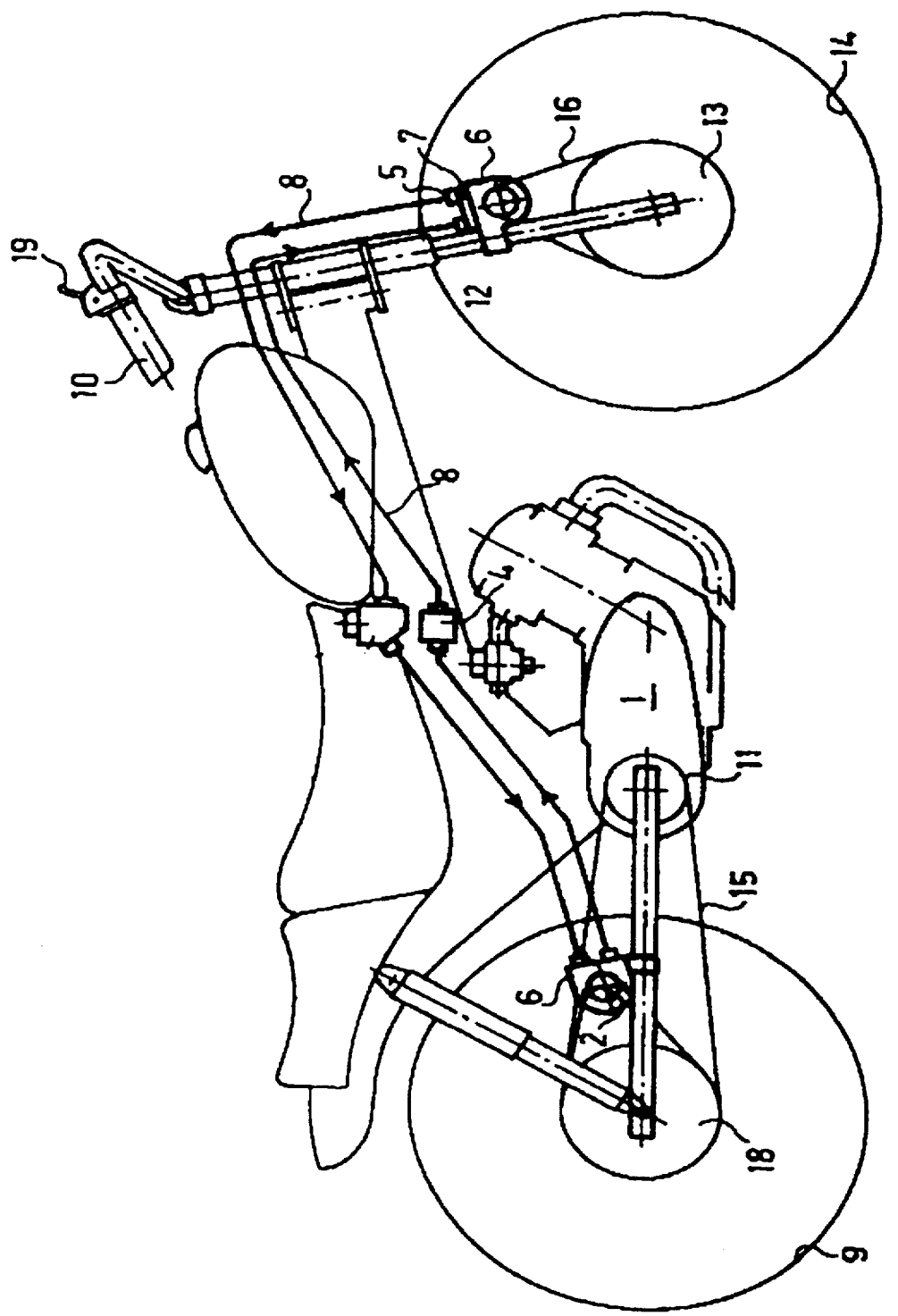
FIG. 2 shows a second preferred embodiment of the inventive motorcycle.

In the embodiment of the inventive motorcycle shown in FIG. 2, hydraulic pump 2 is fastened to the swing arm rear suspension and mounted via a twin driving chain wheel 18.

What is claimed is:

1. A two wheel drive motorcycle comprising:
    a steerable front wheel;
    a rear wheel;
    a driving motor coupled to the rear wheel, the driving motor driving the rear wheel;
    an accelerator for controlling the power output of the driving motor;
    a transmission for driving the front wheel comprising,
        a hydraulic pump having a constant output driven by the driving motor,
        a hydraulic motor coupled to the front wheel for providing the power to drive the front wheel, the hydraulic motor being fed hydraulic fluid from the hydraulic pump via a pressure line and having an input matched to the pump output,
        a check valve for redirecting the flow of hydraulic fluid from the pressure line to a return line bypassing the hydraulic motor when the rotational speed of the rear wheel differs from the rotational speed of the front wheel by a preselected amount,
        a pressure valve coupled to the pressure line for maintaining fluid pressure within the pressure line to a preselected level; and
    a selector coupled to the accelerator for selecting the pressure to be maintained by the pressure valve, wherein as the accelerator increases the power output of the driving motor the selector selects a higher pressure level to be maintained by the pressure valve.

2. A two wheel drive motorcycle as recited in claim 1 fluid pressure preselected level is within the range of 20 to 100 bars.

3. A two wheel drive motorcycle as recited in claim 1 wherein the check valve does not redirect the flow of hydraulic fluid from the pressure line to the return line when the rotational speed of the rear wheel is at a predetermined amount within the range of 1% to 3% faster than the rotational speed of the front wheel.

4. A two wheel drive motorcycle as recited in claim 1 wherein the check valve redirects the fluid from the pressure line to a return line bypassing the hydraulic motor when the rotational speed of the rear wheel is not more than a preselected amount selected from the range of 1%–3% faster than the rotational speed of the front wheel.

* * * * *